March 19, 1935. E. S. HARTSON 1,994,819
FRICTION RING AND CLAMPING MEANS THEREFOR
Filed July 7, 1928
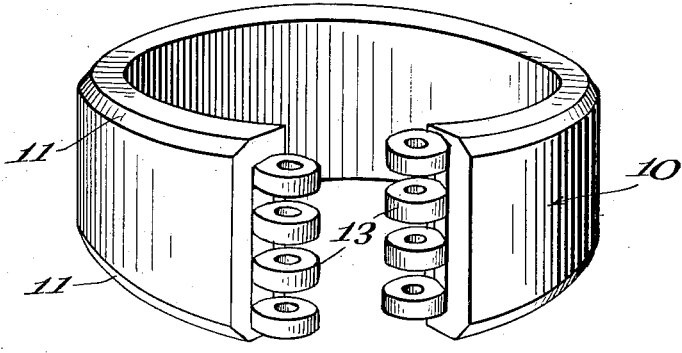
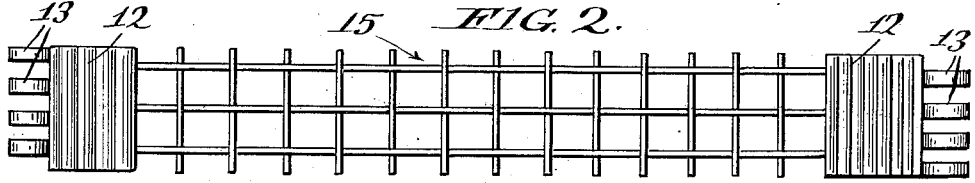
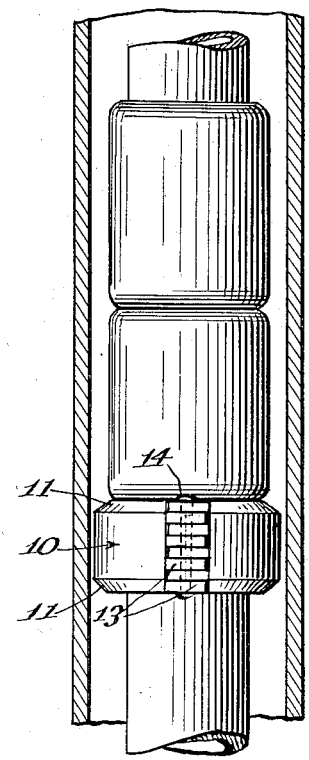
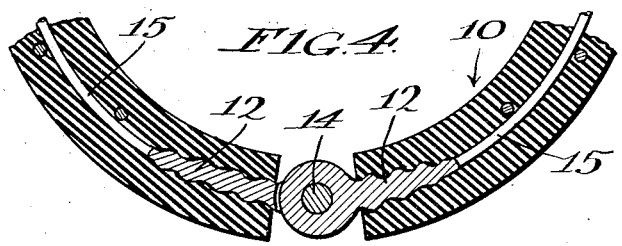
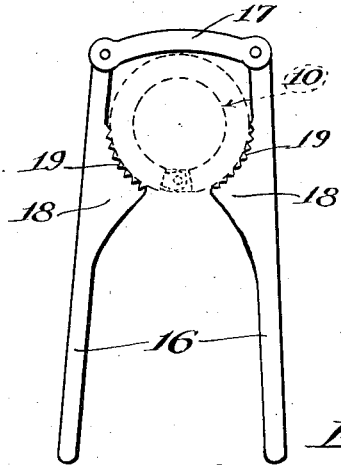
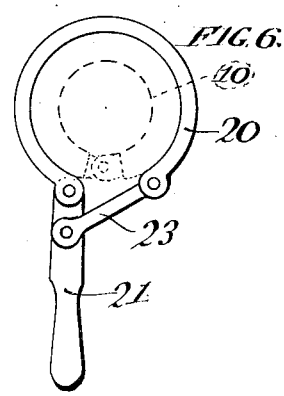
INVENTOR.
E. S. HARTSON.
By Martin P. Smith ATTY.

Patented Mar. 19, 1935

1,994,819

UNITED STATES PATENT OFFICE 1,994,819

FRICTION RING AND CLAMPING MEANS THEREFOR

Earl S. Hartson, Los Angeles, Calif.

Application July 7, 1928, Serial No. 291,114

1 Claim. (Cl. 308—4)

My invention relates to a friction ring of the particular type disclosed in my copending application for U. S. Letters Patent filed April 26, 1928, Sr. No. 273,063, and which friction ring is especially designed for use on the drill pipe of a deep well drilling apparatus and which ring functions as a friction and wear receiving member between the drill pipe and well tube through which said drill pipe operates.

The principal objects of my present invention are to generally improve upon the friction ring disclosed in my aforesaid copending application, as well as other existing forms of friction rings, further to provide means preferably embedded in the body of the ring for materially reinforcing and strengthening said body and preventing the connecting means at the ends of the ring from pulling out as a result of service strains, and further to provide simple and efficient means for pulling the ends of the rings together in order that the connecting means may be securely fastened when the ring is applied to the drill pipe.

With the foregoing and other objects in view, my invention consists in certain novel features of construction and arrangement of parts that will hereinafter be more fully described and claimed and illustrated in the accompanying drawing, in which:

Fig. 1 is a perspective view of a friction ring embodying the principles of my invention.

Fig. 2 is an elevational view of the joint members that project from the ends of the body of the ring and showing the ring body reinforcing means that connects said connecting means and which is imbedded in the body of the ring.

Fig. 3 is a vertical section taken lengthwise through a short section of well tubing with a drill pipe positioned therein and showing my improved friction ring in position on the drill pipe just below the joint or box therein.

Fig. 4 is an enlarged horizontal section taken through the end portions of the friction ring and showing the attaching and connecting members imbedded therein.

Figs. 5 and 6 are top plan views of different forms of clamps that may be used for applying the friction rings to the drill pipe.

Referring by numerals to the accompanying drawing which illustrates a practical embodiment of my invention, 10 designates a split or open ring that may be formed of rubber, compressed fiber or composition of which rubber or fiber is the principal ingredient, and the internal diameter of this ring is such as to fit snugly on the standard sizes of drill pipes. The width and thickness of the body of the ring may vary according to the size of the drill pipe on which the ring is used, but for average sized drill pipe, for instance a pipe having an external diameter of four inches, the body of the ring may be approximately one and one-half inches in thickness and two and one-half or three inches in width.

The outer corners of the body of the ring are preferably beveled, as designated at 11, so that said ring will not catch and hang on shoulders at the ends of sections of well tubing as the drill pipe on which the friction rings are carried is elevated or lowered within said well tube.

In order that the ends of the split ring may be firmly secured to each other when the ring is positioned around a drill pipe, metal plates 12, preferably having ribbed or corrugated surfaces, are imbedded in the ends of the body of the ring and formed integral with the outer ends of these plates and projecting from the ends of the ring, are horizontally disposed perforated lugs 13 which, when the ends of the ring are brought together, overlie each other and by means of a pin or rivet 14 that passes through the apertures in said lugs, the ends of the ring are very securely connected to each other.

In order to reinforce and strengthen the body of the ring 10 throughout its length and to prevent plates 12 from pulling out of the end of the ring, the two plates are connected by a flexible reticulated web 15, preferably composed of wire netting or fabric.

In the use of the wire netting or fabric I prefer to arrange the same so that a plurality of wires have their ends secured directly to the plates 12, preferably by welding, and said wires being interlaced with a series of short wires and the entire web or fabric being imbedded in the body of the ring 10 at the time the same is formed.

After the friction ring has been applied to the drill pipe immediately beneath a joint or box, as illustrated in Fig. 3, the ends of the pin or rivet 14 are upset or riveted so as to firmly secure the same in position within the lugs 13, and thus the ring is firmly secured in the desired position around the drill pipe.

When the ring is applied to the drill pipe it is necessary to utilize considerable force to bring the projecting lugs 13 at the ends of the ring into overlapping engagement with each other and to render this operation comparatively easy I prefer to apply the rings with manually operable clamps, two different forms of which are illustrated in Figs. 5 and 6.

In the construction illustrated in Fig. 6 a pair of lever-like arms 16 are pivotally connected at one end to a link 17 and formed on the inner faces of said arms near the link are inwardly presented lugs 18, and which lugs are provided with curved corrugated faces 19 which, when the device engages a friction ring, as illustrated by dotted lines in Fig. 5, grips said ring near its ends and by compressing the outer ends of the arms 16 toward each other the ring is tightly drawn around the drill pipe until the lugs 13 overlap each other so as to receive the connecting pin or rivet.

In the form of clamp illustrated in Fig. 6 a flexible clamping band 20 is adapted to encircle the friction ring and one end of said clamp band is pivotally connected to one end of a lever 21, while the opposite end of said clamp band is pivotally connected to one end of a link 23 and the opposite end of said link being pivotally connected to lever 21 near the point where the band 20 is connected.

Inasmuch as the external diameter of the ring is greater than the diameter of the box or joint in the drill pipe, said ring will make contact with the inner surface of the well tube as the drill pipe is operated therein, and thus said ring performs the functions of a spacer to maintain the drill pipe in a central position within the well tube and said ring also acts to receive all friction and wear resulting from contact with the well tube or casing and consequently protecting the joints in the drill tube against wear while in service.

Thus it will be seen that I have provided a drill pipe friction ring that is relatively simple in construction, inexpensive of manufacture, capable of being readily applied to the drill pipe, and which ring is reinforced throughout its length by a reticulated web or band that is directly connected to the members in the ends of the ring that are connected to each other when said ring is fastened upon a drill pipe.

It will be understood that minor changes in the size, form and construction of the various parts of my improved friction ring and clamping means therefor may be made and substituted for those herein shown and described without departing from the spirit of my invention, the scope of which is set forth in the appended claim.

I claim as my invention:

A friction ring for drill pipes, comprising a split ring formed of flexible wear resisting material, metal plates imbedded in the end portions of said split ring, both faces of which plates are corrugated, a series of perforated lugs formed integral with each plate and projecting beyond the end of the ring, one series of lugs being adapted to overlie the other series, a pin passing through the apertures in both series of lugs and a flexible woven reenforcing member connecting the inner ends of said corrugated plates and extending lengthwise through the body of the split ring.

EARL S. HARTSON.